(12) United States Patent
Wei

(10) Patent No.: US 8,584,348 B2
(45) Date of Patent: Nov. 19, 2013

(54) METHOD OF MAKING A SURFACE COATED ELECTRONIC CERAMIC COMPONENT

(75) Inventor: Frank Wei, Valencia, CA (US)

(73) Assignee: Weis Innovations, Valencia, CA (US)

( * ) Notice: Subject to any disclaimer, the term of this patent is extended or adjusted under 35 U.S.C. 154(b) by 0 days.

(21) Appl. No.: 13/199,651

(22) Filed: Sep. 6, 2011

(65) Prior Publication Data

US 2012/0223798 A1 Sep. 6, 2012

Related U.S. Application Data

(60) Provisional application No. 61/449,647, filed on Mar. 5, 2011.

(51) Int. Cl.
*H01F 7/06* (2006.01)

(52) U.S. Cl.
USPC ............ 29/602.1; 29/605; 29/606; 29/832; 29/841; 29/856; 336/83; 336/175; 336/192; 336/200; 336/212; 338/21; 338/22 R; 361/321.1

(58) Field of Classification Search
USPC ........ 29/602.1, 605, 606, 608, 832, 841, 848, 29/856, 858, 883; 336/83, 175, 192, 200, 336/212, 233; 338/21, 22 R; 427/58; 361/321.1
See application file for complete search history.

(56) References Cited

U.S. PATENT DOCUMENTS

| | | | | |
|---|---|---|---|---|
| 4,992,771 A * | 2/1991 | Caporali et al. | ............ | 338/22 R |
| 5,339,068 A * | 8/1994 | Tsunoda et al. | ............ | 338/332 |
| 5,994,995 A * | 11/1999 | Ogasawara et al. | ............ | 338/21 |
| 6,081,181 A * | 6/2000 | Kawase et al. | ............ | 338/22 R |
| 6,154,112 A * | 11/2000 | Aoba et al. | ............ | 336/192 |
| 6,362,723 B1 * | 3/2002 | Kawase | ............ | 338/22 R |
| 6,377,151 B1 * | 4/2002 | Takayama et al. | ............ | 336/83 |
| 6,525,395 B1 * | 2/2003 | Kawase et al. | ............ | 257/528 |
| 6,535,095 B2 * | 3/2003 | Aoki et al. | ............ | 336/83 |
| 6,876,286 B2 * | 4/2005 | Shikama et al. | ............ | 336/192 |
| 7,373,715 B2 * | 5/2008 | Hirai et al. | ............ | 29/606 |

* cited by examiner

*Primary Examiner* — Paul D Kim
(74) *Attorney, Agent, or Firm* — Blank Rome LLP

(57) ABSTRACT

A method of making an electronic ceramic component. The method includes steps of terminating a ceramic body with a metalized terminal and encompassing a portion of the ceramic body by an insulating resin. The step of encompassing further comprises steps of preparing a liquid resin precursor, applying the liquid resin precursor to a surface of the ceramic body, thereby wetting the surface of the ceramic body while not wetting the metalized terminal, and curing the liquid resin precursor applied to the wetted surface of the ceramic body to form a resin coating covering the surface of the ceramic body after removing extra quantity of the liquid resin precursor from the not wetted metalized terminal. The liquid resin precursor comprises an element selected from a group consisting of resin solution or resin emulsion that has a surface tension adjusted by changing a resin precursor concentration.

10 Claims, 5 Drawing Sheets

METHOD OF MAKING A SURFACE COATED ELECTRONIC CERAMIC COMPONENT

CROSS REFERENCE OF RELATED APPLICATION

| U.S. patent documents | | | |
|---|---|---|---|
| 3,251,918 | May 1966 | Seney et al. | 264/135 |
| 3,264,268 | August 1966 | Lee et al. | 427/458 |
| 4,168,520 | September 1979 | Coleman et al. | 361/308 |
| 4,627,139 | December 1986 | Muller et al. | 316/431 |
| 11/493,685 | July 2006 | Jackson et al. | 174/250 |

Other Publications

Frank Wei, "Self-Selective Conformal Coating of surface-Mount Ceramic Components". CARTS Conference Proceedings, March 2011, Jacksonville, Fla.

This is a non-provisional application that claims the benefit of priority under 35 U.S.C. §119 to a —provisional application, application No. 61/449,647, filed Mar. 5, 2011.

BACKGROUND OF THE PRESENT INVENTION

1. Field of Invention

The present invention relates to a conformal coating for surface mount type electronic ceramic components and to a method of forming insulating coating partially covering the components. More particularly, the present invention relates to the formation of an insulating conformal coating on the surface of ceramic body in the location between each pair of the electrode terminals of the components. Such a conformal coating partially covers the component body and leave conductive electrode terminals uncovered so that the solderability and the electrical conductivity of the electrode terminals are not affected. The partial conformal coating improves the surface insulation resistance of the ceramic components, protects the component from environment, and works as color coding as well.

2. Description of Related Arts

Electronic ceramic components such as ceramic chip capacitors, ceramic chip inductors, ceramic chip resistors, ceramic chip varistors, ceramic chip thermistors, and etc., are widely used in a growing number of electronic products. Although the varied electronic ceramic components are made from different ceramic materials in different electrical configurations, most electronic ceramic components are built according to a common structure as shown in FIG. 1 to comprise a functional ceramic body (11) terminated with two metalized conductive electrode terminals (12) at two opposite ends of the ceramic body.

Following recent miniaturization trends, smaller and smaller electronic ceramic components are created in leadless format to suit surface mount board assembly process for digital and analog circuits, even for high temperature and voltage applications. Surface insulation resistance, one of the most important electrical characteristics of the ceramic component is determined by the component design and surface condition of the ceramic body. Surface insulation resistance can be negatively affected by the ever-shrinking component dimensions demanded by industry, especially for high voltage applications or under serious working environments. A poor surface condition leading to degraded surface insulation resistance can cause many reliability and performance issues, such as:

1) Surface arcing, a corona discharge between the two electrode terminals induced by low surface insulation due to surface contaminations of metal smearing or moisture trapped in the porous ceramic surface, leaves a conductive path on the ceramic body surface leading to component failure.

2) Tin whisker growth, commonly occurring under the influence of complex surface and working conditions when pure tin is plated as the most outside solder layer of the electrode terminals, is another surface condition issue which may cause false data pulses, intermittent failures and, in extreme circumstances, electrical overstress.

3) Difficulties in manufacturing process may also arise from low surface insulation resistance. For instance, certain electronic components made from low insulating ceramics, such as chip inductors made from magnetic ceramics or thermistors made from semiconductive ceramic materials, are hard to be electrical-plated during the production process since metal ions in the plating solution tend to deposit on the surface of the low insulation ceramic body.

To improve the surface condition of an electronic ceramic component, conventionally, a conformal coating is applied to the entire component, covering not only the surface of the ceramic body but the end conductive electrode terminals as well. As early as 1966, Seney et al. disclosed a conformal coating method of applying a glass slurry to the entire surface of a ceramic capacitor to form a thin layer of glaze coverage in U.S. Pat. No. 3,251,918. In 1979, Coleman et al. disclosed in U.S. Pat. No. 4,168,520 a method to attach wire leads to a monolithic ceramic chip capacitor and subsequently coating the leaded capacitor with free-flowed protective resin. In 1986, Muller et al. in U.S. Pat. No. 4,627,139 disclosed a method of dip-coating multiple monolithic ceramic capacitors at one time by pre-positioning the ceramic components on a pair of parallel integral multi-leaded carrier strip to improve the effectiveness of the coating process.

Therefore, it becomes the most conventional method to apply a conformal coating to an electronic ceramic component by attaching lead wires (21) to a leadless component to make it into a wire leaded component then inserting the wire leaded component into a resin solution tank or a resin powder pool to form a fully encapsulated seal (22) of the entire component as shown in FIG. 2, The component is fully encapsulated and the component is capable of being electrically connected through the conductive lead wires.

Such an encapsulated seal does effectively protect the component from environment and enhance the component reliability. However, there are also some negative side effects. In order to keep a conformal coated component electrically connected to the circuit, a metal lead wire (21) or metal lead frame (not shown) has to be attached to each end terminal (12) before the whole component can be conformal coated or encapsulated. The result is a coated lead-attached component that is only suitable for through-hole circuit board assembly process, but not for surface mount assembly process. Besides being procedurally restrictive, the lead attaching process is usually much more costly in terms of material and labor. A heat dissipation problem, especially for high power components, may also arise when a component is fully encapsulated.

For many applications, a full conformal coating where the component body is fully encapsulated may not be necessary. A partial conformal coating applied only to the ceramic body would be commercially acceptable for many applications requiring improvements to the surface condition of the component as shown in the present invention. For example, a ring shaped insulating coating circulating the ceramic body between the terminals can be effective at stopping tin whisker growth. A partial conformal coating covers ceramic surface only would also suppress surface arcing occurrence.

SUMMARY OF THE PRESENT INVENTION

It is therefore an object of the present invention to provide a partial conformal coating on the surface of an electronic ceramic component without altering the leadless format of the component.

It is a further object of the present invention to provide a partial conformal coating on the surface of an electronic ceramic component without affecting the electrical conductivity and solderability of the electrode terminals of the component.

It is yet a further object of this invention to provide such an electronic ceramic component capable of being partially conformal coated with predetermined shape of cured insulating resin coating.

Additional advantages and features of the invention will become apparent from the description which follows, and may be realized by means of the instrumentalities and combinations particular point out in the appended claims.

The present invention provides an electronic ceramic component in the structure of a functional ceramic body terminated with at least a pair of metalized conductive electrode terminals and an insulating conformal coating formed to cover a portion of the component, particularly encompassing the surface of the ceramic body between the two electrode terminals. The present invention also provides methods to apply an insulating resin coating to a portion of the component surface to improve the surface condition without altering the leadless electrode format of the component. The insulating conformal coating can be made from free-flowed resin solution or resin powder, and be applied on the component surface by printing, painting, coating or any other method in predetermined shape with controlled thickness. The insulating conformal coating may reach the edge of the crown of each metalized electrode terminals, leave the end region of each electrode uncovered so that the solderability and the electrical conductivity of the electrode terminals are not degraded.

According to one embodiment of the invention, there is provided a method to form an insulating conformal coating which partially covers the ceramic portion of the component surface. The electrode terminals are first pre-covered with a fugitive material. Next, a layer of insulating resin is applied to the entire component, including the fugitive materials coated electrodes. After the insulating resin layer is cured, the fugitive material will be removed to leave the insulating coating covering the ceramic surface of the component with exposed end terminals.

According to another embodiment of the invention, there is provided a method to form an insulating conformal coating partially covering the surface of an electronic ceramic component by use of a surface tension adjustable resin solution. Since a shinning surface of metal terminal has higher surface tension (higher wetting contact angle) and is hard to wet than a porous ceramic surface, the surface tension of a resin solution can be properly adjusted to wet the ceramic surface well but not the metal surface of the terminals. Non-wetting resin solution on the surface of metal terminals can be removed while the well-wetted solution still stays on the ceramic surface of the component and to be cured into a conformal coating of resin film.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
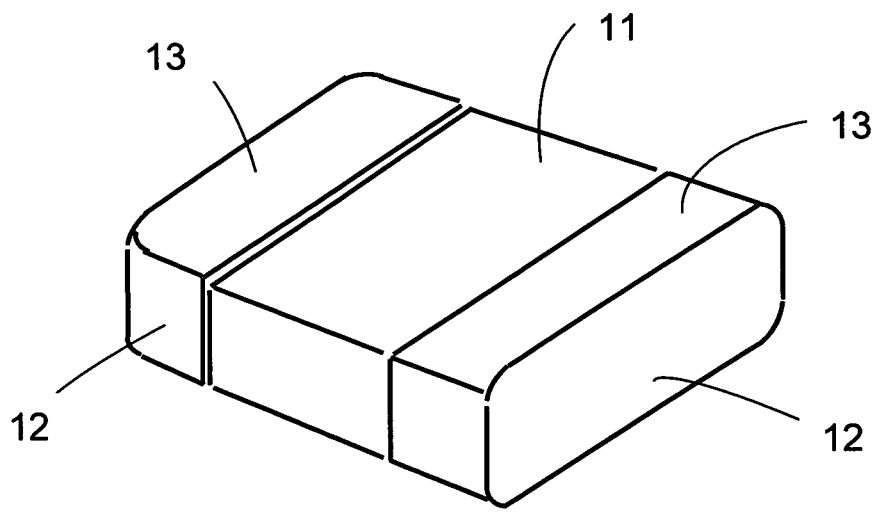
FIG. 1A shows in perspective view of a surface mount type electronic ceramic component in a leadless format with a rectangular ceramic body terminated with a pair of conductive electrode terminals at the ends of the ceramic body.
Figure 1B:
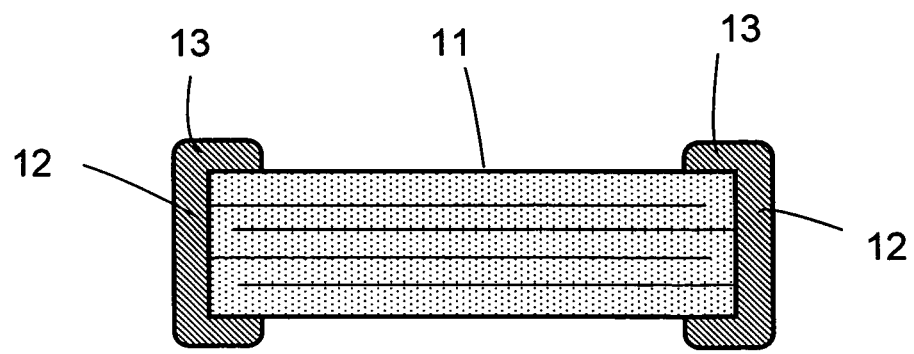
FIG. 1B shows in side sectional view of FIG. 1A.
Figure 2:
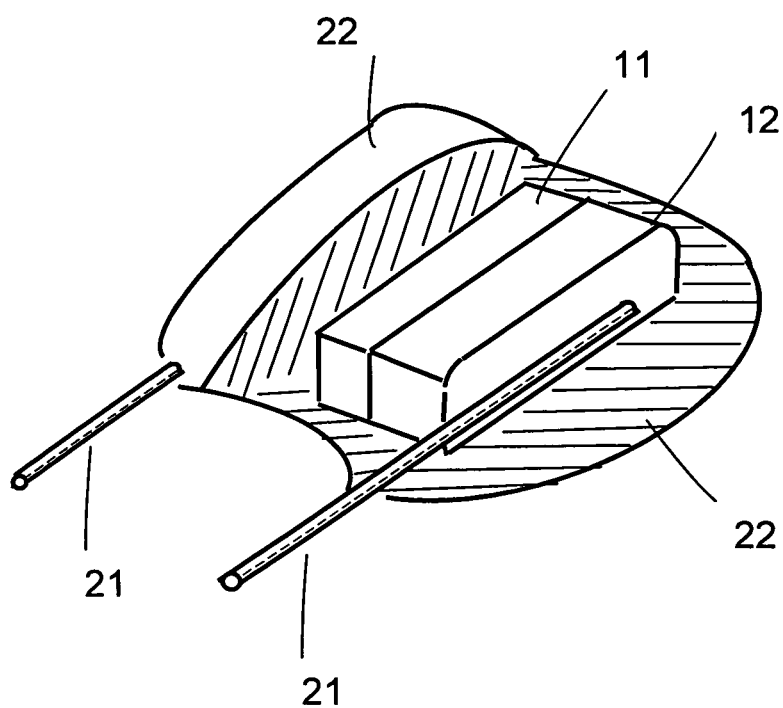
FIG. 2 shows in perspective view with a partial inside section of prior art of a leaded electronic ceramic component fully encapsulated with conformal coating.

As shown in FIG. 1, an electronic ceramic component, such as a surface-mount type electronic ceramic component, is illustrated, wherein the leadless electronic ceramic component comprises a functional ceramic body (11) and two metalized external electrodes terminals (12) covering opposite end of the ceramic body (11). The end metalized terminals (12) are usually created by dipping, brushing, or applying an ink or paste comprising a glass frit, metal particles, and an organic binder to the end regions of the component body and firing the coated body to burn out the organic material and sintering the glass and metal particles, forming a continuously conducting terminal (12) at each end. Each external terminal (12) extends over a portion of faces of the four adjoining ceramic body (11) to form an embracing crown (13) at each end. To make the external terminals (12) solderable to a circuit board through surface mount assembly process, metalized terminals are commonly electrically plated with a tin layer (not shown) on the most outside of the each terminal (12).

The ceramic component further comprises an insulating resin encompassing a portion of the ceramic body (11), wherein the portion thereof is uncovered by the metalized terminal (12), such that the insulating resin forms a surface insulation resistance film of the ceramic body (11). Accordingly, the cured solid insulating resin coating encompasses at least a portion of each side of the ceramic body (11) where is not covered by the metalized terminals (12) of the component. Alternatively, the cured insulating resin coating encompasses a portion of the component and leaves at least a very end region of each metalized terminal (12) uncovered.

Numerous types of insulating materials in powder or liquid form are commercially available for use in forming a conformal coating in predetermined shape that will partially cover the portion of the ceramic body (11) of the electronic ceramic component. Dipping or soaking is the easiest method to apply a free-flow resin powder or resin solution to cover the surface of a subject. Accordingly, the insulating resin is coated at the portion of said ceramic body (11) and is made from at least one of the polymer resins selected from polyacrylic, polyurethane, epoxy, polyester, polypropylene, or any other polymer resin adapted to form a film coating with electrically insulation material. It is worth mentioning that the cured insulating resin coating is in a formation of continuous film with measurable and adjustable thickness.

In order to partially and selectively coat the portion of the ceramic body (11) only (not the metal terminal portion) of a component, the present invention provides a subcomponent where the conductive metal terminals are pre-covered with a fugitive material, such as a temporary adhesive of a water soluble glue. After applying and curing of a resin coating covering the whole ceramic component, the fugitive material will be removed away to form a preferred conformal coating covering ceramic body (11) and leave the metalized terminals (12) uncoated.

According to a preferred embodiment, the ceramic component further comprises a fugitive barrier layer (31) removably covering at the end metalized terminal (12) for working as a sub-chip ready to be coated with the insulating layer. The insulating resin is completely covered at the ceramic body (11) and the metalized terminal (12) and is arranged in such a manner that after the fugitive barrier layer (31) with the insulating resin on top thereof is removed from the metalized terminal (12), the insulating resin only covers at the portion of the ceramic body (11) to leave the metalized terminal (12) uncovered.

The insulating resin is formed by the following steps.

(A) Form the fugitive barrier layer (31) covering at the metalized terminal (12). Preferably, the fugitive barrier layer (31) covers at least the end region of the metalized electrode terminals.

(B) Apply a free-flow resin coating completely over the portion of the ceramic body (11) and the fugitive barrier (31).

(C) Cure the resin coating into an insulating coating film covering the ceramic body (11) and the fugitive barrier (31).

(D) Remove or take off the fugitive barrier layer (31) with the insulating coating film on top thereof to form a conformal coating covering the portion of the ceramic body (11) and to leave the metalized terminal (12) uncovered.

As an example, a 0805 case size positive temperature coefficient (PTC) type chip thermistor made from a manganese doped semi-conductive barium titanate ceramic is coated with a solvent base polyurethane solution to form a sleeve shape conformal coating surrounding the center of the ceramic body.

The 0805 size PTC thermistor component has a dimension of 2.0 mm long×1.3 mm wide×1.0 mm thick with a silver metalized termination covering each end of the ceramic body (11) with a crown (13) embracing the conjoining four sides of the ceramic body (11). The metalized terminals (12) including the crown (13) are about 0.4 mm wide from each end of the ceramic body (11). To make it solderable through a surface mount assembly process a pure tin layer needs to be deposited on the top of the silver electrode terminals by electrode plating method. At room temperature, the insulation resistance of the thermistor component is as low as a few ohms that enables the tin ions in the plating solution deposit on the two end metalized terminals (12) as well as on the ceramic surface at the same time of plating. Applying a partial conformal coating covering the ceramic body surface would protect the ceramic surface from tin deposition during the plating process.

Figure 3:
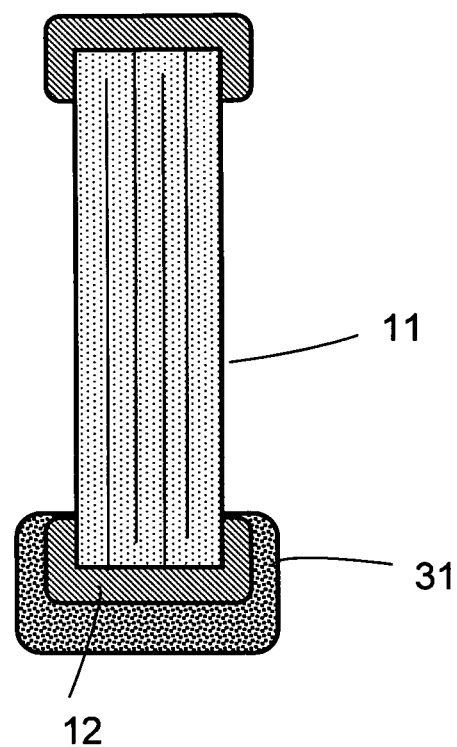
FIG. 3 shows in side sectional view of one end terminal covered with fugitive material.

The first step of the formation of the conformal coating to partially cover the thermistor component is to dip one of the end metalized terminals (12) into a tank filled with an adhesive paste (for example, White Glue 3860, Elmer's Product, Inc. US) in about 0.4 mm deep. The temporary barrier layer (31), as shown in FIG. 3, which covers the end metalized terminal (12), will be formed after lifting the thermistor component out from the adhesive tank and drying in air. Then turn the thermistor component upside-down and repeat the same process to make another temporary barrier layer (31) to cover the other end metalized terminal (12). About 1.2 mm wide ceramic surface at the center of the ceramic body (11) is left uncovered with the temporary adhesive barrier layer (31).

Figure 4A:
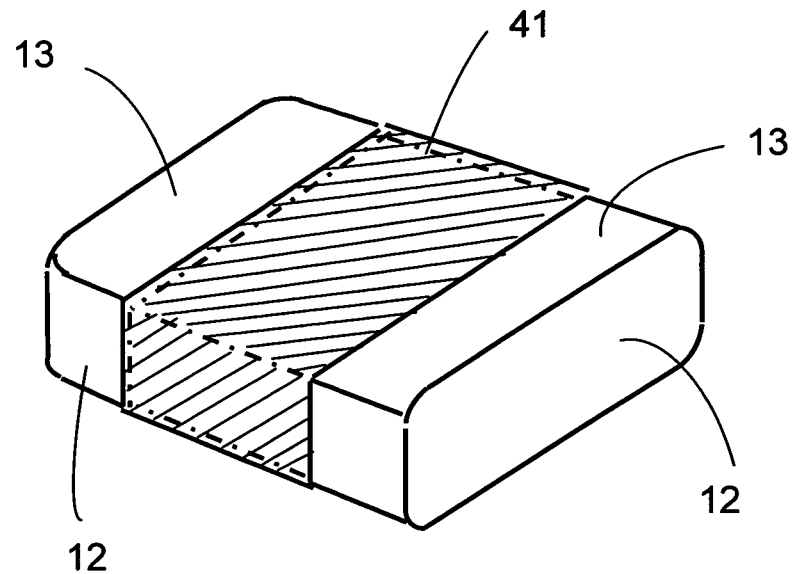
FIG. 4A shows in perspective view of a leadless electronic ceramic component of which ceramic surface is covered with a sleeve shape insulating resin coating.
Figure 4B:
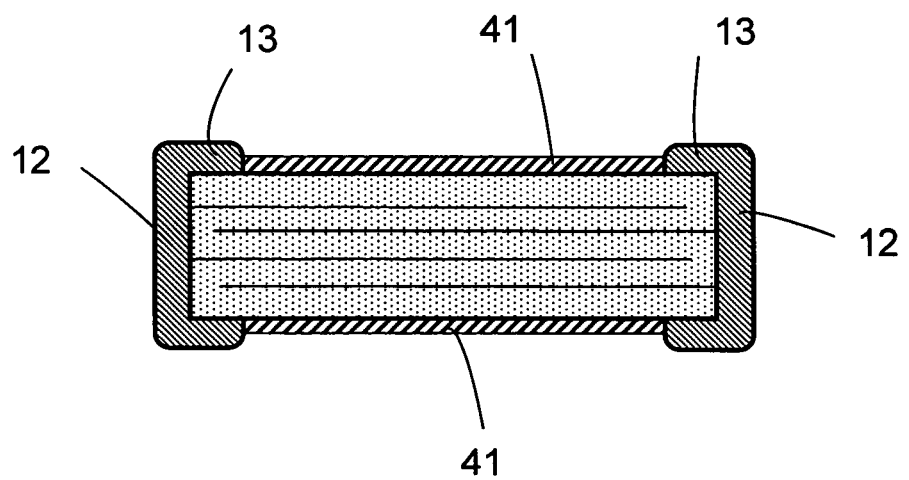
FIG. 4B shows in side sectional view of FIG. 4A.

The second step is to dip thus prepared 0805 size thermistor component into a bath of liquid resin. A wide variety of liquid resins may be used including epoxies, poly-acrylics, silicones, or many other self filming insulating resins. The particular resin liquid employed is a solvent based polyurethane solution (premium grade, Rust-Oleum Corp, US) having a viscosity of 500 centipoise. Once taken out from the bath, extra polyurethane solution hanging on the component surface is removed by spinning the component in a centrifuging machine at 1000 RPM for 1 minute. After the polyurethane coating has been cured in room temperature for 3 hours, the polyurethane coated component is put in an ultrasonic vibration water tank to wash away the fugitive adhesive from the two ends of the component. The cured polyurethane coating on the top of the temporary barrier layers (31) is peeled off together with the fugitive adhesive. Thus a 1.2 mm wide polyurethane coating in a sleeve shape was formed to encompass the four sides of the ceramic body (11). The thermostat component with the sleeve shape insulating resin coating (41) as shown in FIG. 4 is ready for tin plating.

The same insulating resin and same coating method are also applicable to form a partial conformal coating on the surface of a high voltage chip ceramic capacitor for the purpose to improve the component surface condition and to suppress the occurrence of surface arcing.

Figure 5A:
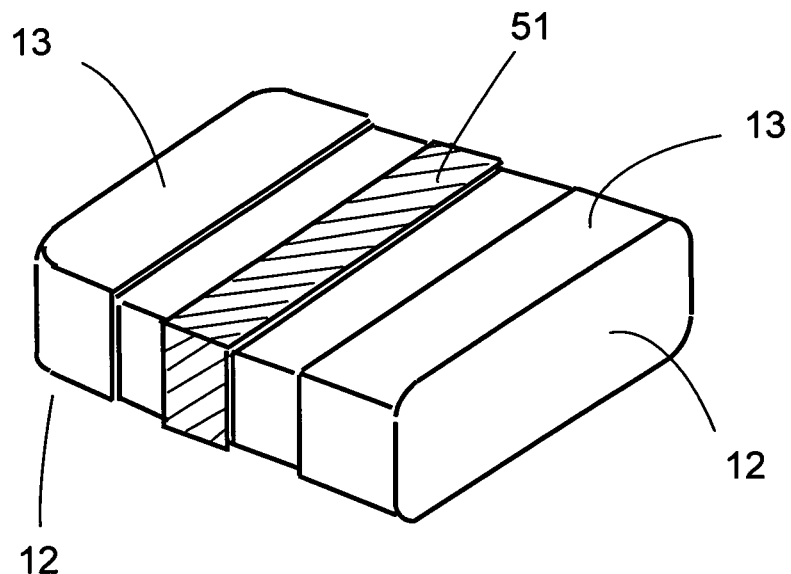
FIG. 5A shows in perspective view of a leadless electronic ceramic component coated with a ring shape insulating resin coating.
Figure 5B:
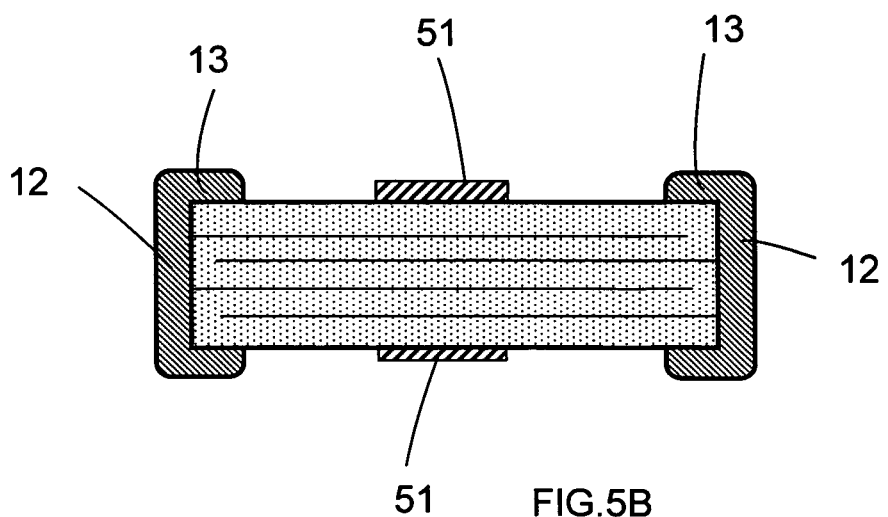
FIG. 5B shows inside sectional view of FIG. 5A.

In certain case, a narrow sleeve coating in a ring shape is preferred for certain application such as to stop the tin whisker growth along the ceramic surface between the two metalized terminals (12). It is possible to adjust the width of the insulating resin sleeve through the control of the dipping depth of the end metalized terminal (12) into the fugitive material tank. A conformal coating in a ring shape (51) as shown in FIG. 5 can be formed by dipping the component to a greater depth, to cover the whole metalized terminals (12) and leave only a portion of ceramic surface uncovered by the fugitive material.

Alternatively, the insulating resin is formed by the following steps.

(A') Prepare a liquid resin precursor comprising resin solution or resin emulsion that has a surface tension adjusted by changing a resin precursor concentration.

(B') Apply the liquid resin precursor to the surface of the component to cover the ceramic body (11) completely.

(C') Cure the liquid resin precursor left on the wetted ceramic surface of the ceramic body (11) to form a conformal resin coating partially covering the surface of the ceramic body (11) after removing extra quantity of the liquid resin precursor from a non-wetting area of the surface of the ceramic body (11). It is worth mentioning that, preferably, the surface tension of the liquid resin precursor is adjusted to wet ceramic surface of the ceramic body (11) but not surface of the metalized terminal (12).

According to the preferred embodiment, the insulating resin coating is cured through the means of temperature change, moisture absorption, radiation dosage, time elapsing, chemical reaction, or other curing method enabling the polymerization of resin.

As another example, a high voltage ceramic chip capacitor is coated with acrylic emulsion to form an insulating resin coating covering the ceramic body (11) surface to improve the surface condition of the component and suppress the surface arcing occurrence.

A plurality of 1206 case size 2000 volts rated high voltage ceramic chip capacitors in leadless format as shown in FIG. 1, known as surface arcing rejected components due to the surface contamination of metal smearing, is first washed in a diluted HCl solution and rinsed with DI water to clean the surface metal smearing. Dried components were soaked in a tank filled with a waterborne acrylic polymer emulsion (for example, Joncryl 95, Jonson Polymer, US). The polymer emulsion was pre-diluted with DI water to a 10 wt % of solids concentration for the purpose to adjust the surface tension of the emulsion to have a wetting contact angle to the ceramic body surface less than 45 degree and a wetting contact angle to the metalized terminals surface more than 90 degree. The wetting angles of the 10 wt % emulsion are measured by dropping it on a flat surface of an electrical plated pure tin plate or a barium titanate ceramic substrate similar to the dielectric 1206 capacitors are made from. The emulsion wets ceramic substrate well with a contact angle of 25 degree, but does not wet the pure tin terminals at all. Soaked in the emulsion for 5 minutes, the ceramic surface of each component is completely covered with the 10 wt % acrylic emulsion. By spinning the whole batch of wet components in a centrifuging machine at 2000 rpm for 10 seconds the extra emulsion liquid is removed from the end metalized terminals (12). The wet components were further dried in hot air. An insulating acrylic film is so formed to cover the ceramic surface of each component, leave the end metalized terminals (12) uncovered.

As a result, the scope of the present invention extends to a variety of insulating resin materials, types of electronic ceramic component, and processing techniques which can be used to improve the surface condition and reliability of an electronic ceramic component without changing its leadless format by applying a partial conformal coating as disclosed above.

One skilled in the art will understand that the embodiment of the present invention as shown in the drawings and described above is exemplary only and not intended to be limiting.

It will thus be seen that the objects of the present invention have been fully and effectively accomplished. Embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method of making an electronic ceramic component, comprising the steps of:
    terminating a ceramic body to form at least one metalized terminal covering a respective end region of the ceramic body to form at least one leadless electrode;
    encompassing a portion of the ceramic body by an insulating resin, the step of encompassing comprising substeps of:
        preparing a liquid resin precursor comprising an element selected from a group consisting of resin solution or resin emulsion that has a surface tension adjusted by changing a resin precursor concentration;
        applying the liquid resin precursor to a surface of the ceramic body to cover the surface of the ceramic body partially, thereby wetting the surface of the ceramic body while not wetting the at least one metalized terminal; and
    curing the liquid resin precursor applied to the wetted surface of the ceramic body to form a resin coating partially covering the surface of the ceramic body after removing extra quantity of the liquid resin precursor from the not wetted at least one metalized terminal.

2. The method, as recited in claim 1, wherein the insulating resin is coated on the surface of the ceramic body and is made from one or more polymer resins selected from the group consisting of polyacrylic, polyurethane, epoxy, polyester, and polypropylene.

3. The method as recited in claim 1 wherein, in the step of terminating, the at least one metalized terminal forms a metalized crown extending over edges of adjoining surfaces of the ceramic body to form the leadless electrode.

4. The method, as recited in claim 1, wherein the surface tension of the liquid resin precursor is adjusted to wet the surface of the ceramic body but not the at least one metalized terminal.

5. The method, as recited in claim 4, wherein the liquid resin precursor comprises one or more polymer resins selected from the group consisting of polyacrylic, polyurethane, epoxy, polyester, and polypropylene.

6. The method, as recited in claim 5, wherein the resin coating is cured by polymerization of resin through a curing method selected from the group consisting of temperature changing, moisture absorbing, radiation dosaging, time elapsing, and chemical reacting.

7. The method, as recited in claim 4, wherein the resin coating is cured by polymerization of resin through a curing method selected from the group consisting of temperature changing, moisture absorbing, radiation dosaging, time elapsing, and chemical reacting.

8. The method as recited in claim 7 wherein, in the step of terminating, the at least one metalized terminal forms a metalized crown extending over edges of adjoining surfaces of the ceramic body to form the at least one leadless electrode.

9. The method, as recited in claim 1, wherein the liquid resin precursor comprises one or more polymer resins selected from the group consisting of polyacrylic, polyurethane, epoxy, polyester, and polypropylene.

10. The method, as recited in claim 1, wherein the resin coating is cured by polymerization of resin through a curing method selected from the group consisting of temperature changing, moisture absorbing, radiation dosaging, time elapsing, and chemical reacting.

* * * * *